US012665153B1

(12) United States Patent
Panstingel et al.

(10) Patent No.: US 12,665,153 B1
(45) Date of Patent: Jun. 23, 2026

(54) SCREW TYPE PANEL MOUNT FUSE HOLDER LOCK OUT DEVICE

(71) Applicant: Meta Platforms, Inc., Menlo Park, CA (US)

(72) Inventors: Michael Panstingel, Westerville, OH (US); Caleb Tullos, Marion, OH (US)

(73) Assignee: Meta Platforms, Inc., Menlo Park, CA (US)

( * ) Notice: Subject to any disclaimer, the term of this patent is extended or adjusted under 35 U.S.C. 154(b) by 700 days.

(21) Appl. No.: 18/145,408

(22) Filed: Dec. 22, 2022

(51) Int. Cl.
*H01H 85/24* (2006.01)
*H01H 85/20* (2006.01)
*H01H 85/25* (2006.01)
*H01H 85/52* (2006.01)

(52) U.S. Cl.
CPC ........ *H01H 85/24* (2013.01); *H01H 85/2005* (2013.01); *H01H 85/25* (2013.01); *H01H 85/52* (2013.01)

(58) Field of Classification Search
CPC ........ H01H 85/22; H01H 85/24; H01H 85/25; H01H 85/52; H01H 85/2005; H01R 13/443
See application file for complete search history.

(56) References Cited

U.S. PATENT DOCUMENTS 908,118 A * 12/1908 Murray .............. H01H 85/2005 337/216

OTHER PUBLICATIONS

"Insulation plugs for fuses Incl. padlock adaptor." Lockout-Tagout-Shop, 2020, web.archive.org/web/20201031101111/www.lockout-tagout-shop.com/en/insulation-plugs-for-fuses-incl-padlock-adaptor.html. Accessed Oct. 20, 2025. (Year: 2020).*
E-Square, "Set of RFHL 2, 3 OT-RFHL," Model: ES-RFHL KIT, Oct. 28, 2022, 5 pages, Retrieved from Internet: URL: https://www.safetylock.net/set-of-rfhl-2-3-and-operating-tool-es-rfhl-kit.html.

* cited by examiner

*Primary Examiner* — Livius R. Cazan
(74) *Attorney, Agent, or Firm* — EVERSHEDS SUTHERLAND (US) LLP

(57) ABSTRACT

An example lock out device includes a plug of electrically insulating material and a hinged bracket to receive the plug. The plug includes a cap and a threaded portion to threadedly engage with a threaded opening of a fuse holder. The hinged bracket includes a first section having a base with a first opening and walls forming a first cavity to permit the threaded portion of the plug to pass through the base portion, and a second section having a lid and walls forming a second cavity. The first and second sections are moveably connected via a hinge to enable movement of the first and/or second section relative to each other between an open position and a closed position. When the hinged bracket is closed a first eye and a second eye are aligned to enable a locking element to pass through both the first and second eye.

19 Claims, 9 Drawing Sheets

SCREW TYPE PANEL MOUNT FUSE HOLDER LOCK OUT DEVICE

BACKGROUND

Fuse holders utilized for control circuits in certain electronic or computing equipment such as, e.g., equipment installed throughout a data center, do not have lock out devices that can be physically locked. Such fuse holders typically have a threaded opening that receives a threaded fuse cap which retains a fuse in place within the fuse holder. Multiple critical components that are powered by the control circuits can fail on a regular basis, particularly if the data center has a large number of equipment units deployed. When such components fail they pose a detrimental effect to the data center power and cooling calculations, which causes the site to lose efficiency and potentially cause damage to infrastructure. Currently, there is no safe way to remove a fuse for repair or replacement of a failed control circuit component while leaving the equipment unit in a powered on state. Consequently, an equipment unit must be powered down to replace or repair a failed control circuit component, which causes de-energizing of downstream critical loads.

SUMMARY OF PARTICULAR EXAMPLES

In some examples, an apparatus includes a plug including an electrically insulating material, the plug including a cap, and a threaded portion sized to threadedly engage with a threaded opening of a fuse holder, and a hinged bracket to receive the plug, the hinged bracket including a first section including a base portion and one or more walls forming a first cavity, a first opening in the base portion, the first opening having a first dimension larger than a diameter of the threaded portion of the plug to permit the threaded portion of the plug to pass through the base portion, the first dimension being smaller than a lateral dimension of the cap, and a first lock portion including a first eye to receive a locking element, and a second section including a lid portion and one or more walls forming a second cavity, and a second lock portion including a second eye to receive the locking element, where the first section and the second section are moveably connected via a hinge to enable movement of at least one of the first section or the second section relative to each other between an open position and a closed position, and where when the hinged bracket is in the closed position the first eye of the first lock portion and the second eye of the second lock portion are aligned to enable the locking element to pass through both the first eye and the second eye.

In some examples, a method of securing an empty fuse holder includes inserting a plug including an electrically insulating material into a hinged bracket, where the plug includes a cap, and a threaded portion sized to threadedly engage with a threaded opening of a fuse holder, and where the hinged bracket includes a first section including a base portion and one or more walls forming a first cavity, a first opening in the base portion, the first opening having a first dimension larger than a diameter of the threaded portion of the plug to permit the threaded portion of the plug to pass through the base portion, the first dimension being smaller than a lateral dimension of the cap, and a first lock portion including a first eye to receive a locking element, and a second section including a lid portion and one or more walls forming a second cavity, and a second lock portion including a second eye to receive the locking element, where the first section and the second section are moveably connected via a hinge to enable movement of at least one of the first section or the second section relative to each other between an open position and a closed position, and where when the hinged bracket is in the closed position the first eye of the first lock portion and the second eye of the second lock portion are aligned to enable the locking element to pass through both the first eye and the second eye, where the plug is inserted into the hinged bracket such that the threaded portion extends through the first opening, placing the hinged bracket over the fuse holder such that one or more of the first opening is positioned over a threaded opening of the fuse holder or the threaded portion of the plug is placed at the threaded opening of the fuse holder, turning the plug to cause the threaded portion of the plug to be threadedly inserted within the fuse holder, and moving the second section of the hinged bracket over the first section of the hinged bracket and the plug to place the hinged bracket in the closed position.

In some examples, a lock out device includes a plug including an electrically insulating material, the plug including a cap, and a threaded portion sized to threadedly engage with a threaded opening of a fuse holder, and means for securing the plug when the plug is threadedly inserted into the opening of the fuse holder.

BRIEF DESCRIPTION OF THE DRAWINGS

The various advantages of the examples will become apparent to one skilled in the art by reading the following specification and appended claims, and by referencing the following drawings, in which:

DESCRIPTION OF EXAMPLES

Figure 1:
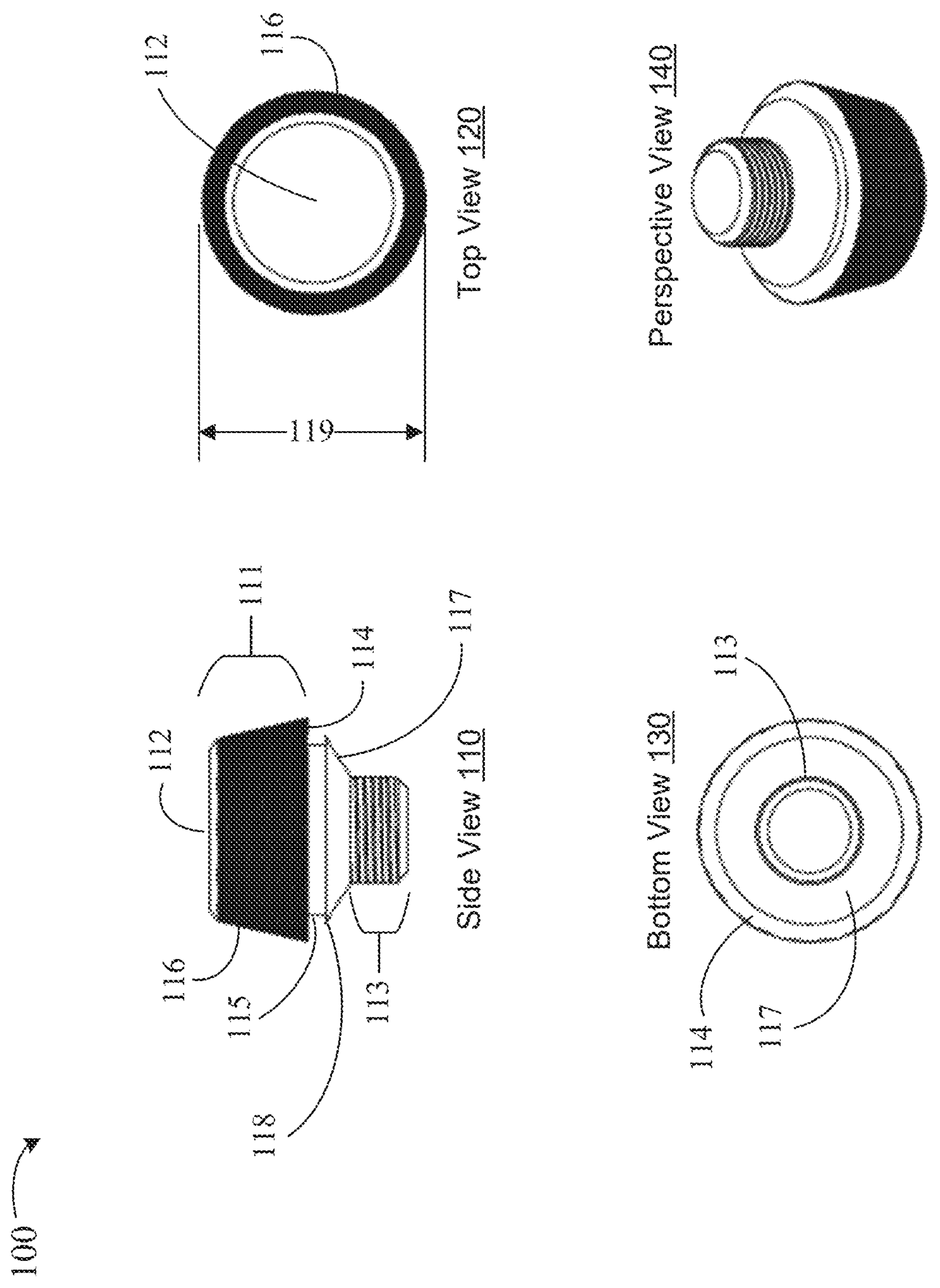
FIG. 1 provides diagrams illustrating a plug for a lock out device according to one or more examples.

A new lock out device as described herein attaches to an open (e.g., empty) fuse holder in a manner that prevents a fuse from being installed, which then proves that an air gap exists and that hazardous energy is isolated from the load side of the fuse holder. The lock out device cannot be removed from the fuse holder once it has been inserted into the fuse holder and a lock has been applied. In examples the lock out device has a window that a person can use to verify that no fuse is present within the fuse holder. In examples the lock out device is able to withstand the OSHA-required 50 pounds of mechanical force.

The lock out device as described herein helps improve the overall safety and efficiency of equipment units by providing a safe way to remove power from specific components having a fuse to permit repair or replacement of the unit without the need to power down other downstream equipment or components For example, equipment racks used in a data center include equipment to monitor current and/or voltage used by electrical or computer components in the rack. The equipment/components in the rack are typically powered via a series of fuses contained in a fuse panel on the rack. In the event of an equipment or component failure, the lock out device enables service personnel to safely remove a fuse that powers the failed equipment/component and then perform service (e.g., repair or replacement) on the equipment/component without the need to power down other equipment or components in the rack or downstream. The device operates to provide a lockable mechanism for the fuse holder such that no fuse can be inserted in an empty fuse holder during servicing—thus keeping the particular circuit under service open, and that no person can accidently place an object (e.g., a tool such as a screwdriver, or a finger, etc.) into the empty fuse holder. Further, in examples the lock out device provides a window so that service personnel can confirm that a plug is in place—and, thus, that no fuse is in place. In some examples, the lock out device is also known as a lock out tag out (LOTO) device.

Without the lock out device as described herein, an open/empty fuse holder presents safety risks in at least several ways. For example, a fuse could be inserted into the empty fuse holder during servicing, thereby providing power unexpectantly to areas in the rack under servicing potentially resulting in electric shock to service personnel and/or damage to equipment/components in the rack. As another example, a device (e.g., a tool such as a screwdriver) or a body part (e.g., finger) could be inserted into the empty fuse holder, potentially resulting in electric shock to service personnel or other personnel touching the fuse holder. As another example, if a fuse is removed but a cap is replaced on the fuse holder, service personnel cannot confirm that the fuse holder is empty without removing the cap, resulting in wasted time in checking (in addition to presenting the foregoing safety risks), and a cap cannot prevent someone from replacing a fuse while servicing is being performed.

FIG. 1 provides diagrams illustrating a plug 100 for a lock out device according to one or more examples, with reference to components and features described herein including but not limited to the figures and associated description. As illustrated in FIG. 1, the example plug 100 is shown in a side view 110, a top view 120, a bottom view 130, and a perspective view 140. The plug 100 is configured to be placed (e.g., inserted) into a hinged bracket 200 (the hinged bracket 200 is described further herein with reference to FIGS. 2A-2C, 3A-3C, 4A-4B and 5A-5C).

According to examples, the plug 100 includes a cap 111 having a top face 112, a bottom face 114 and a side 116. The cap 111 has a lateral dimension 119 (e.g., a diameter as shown in FIG. 1), and is sized to fit within a cavity formed by the hinged bracket 200 (as described further herein) such that, when the hinged bracket 200 is locked in a closed position, the plug 100 is retained within the hinged bracket 200 and cannot be removed. When the plug 100 is inserted in the hinged bracket 200 and the hinged bracket 200 is placed in a closed position, the top face 112 will be visible through a window (i.e., an opening) in the hinged bracket 200. In some examples, the side 116 of the cap 111 has a surface texture to assist in gripping or turning of the plug 100. The surface texture can include any one or more of bumps, ridges, etchings, patches of different smoothness or roughness, etc., each of which can cover varying portion(s) and/or all of the surface area of the side 116. In some examples, the side 116 of the cap 111 is tapered. As an example, as illustrated in FIG. 1, the side 116 is tapered such that the cap 111 is narrower (e.g., smaller diameter) toward the top face 112 and wider (e.g., larger diameter) toward the bottom face 114. Tapering the side 116 of the cap 111 assists in gripping or turning of the plug 100. In some examples the side 116 is not tapered. In some examples, the cap has a circular shape (e.g., as viewed from the top, such as shown in the top view 120). In some examples, the cap has a different shape (as viewed from the top), e.g., a square shape, a hexagonal shape, etc. Any cap shape can be used, so long as the cap fits into the hinged bracket (discussed further herein).

According to examples, the plug 100 also includes a threaded portion 113. The threaded portion 113 is designed with a diameter and threading to match the threading of a threaded opening of a fuse holder (not shown in FIG. 1) enabling the plug to be threadedly inserted into an open/empty fuse holder (e.g., by turning or "screwing" the plug in a clockwise direction for right-handed threading when the plug is placed at the threaded opening of the fuse holder). When the plug is threadedly inserted into the fuse holder, the plug cannot be removed except by turning the plug in the opposite direction (e.g., counter-clockwise for right-handed threading). When the plug is used with the hinged bracket as described herein, the plug can be threadedly inserted into an open/empty fuse holder and then secured (e.g., locked in place), thus preventing removal of the plug which, in turn, prevents undesired or unexpected insertion of a fuse or other object into the fuse holder (e.g., during servicing).

In some examples, the plug 100 also includes a cylindrical portion 115 having a beveled edge 117 between the cap and the threaded portion. The beveled edge 117 is configured to seat against the opening of a fuse holder when the plug is threadedly inserted into the fuse holder. In some examples, the cylindrical portion 115 has a larger diameter than a diameter of the threaded portion, and the beveled edge includes a lip 118 to engage a base portion 221 of the hinged bracket 200 and retain the plug in place within the hinged bracket 200 while permitting the plug 100 to be turned.

The plug 100 is preferably made from an electrically insulating material such as, for example, plastic, nylon, etc. The plug 100 can be manufactured by any known manufacturing techniques such as, e.g., three-dimensional (3D) printing, milling, injection molding, etc.

Figure 2A:
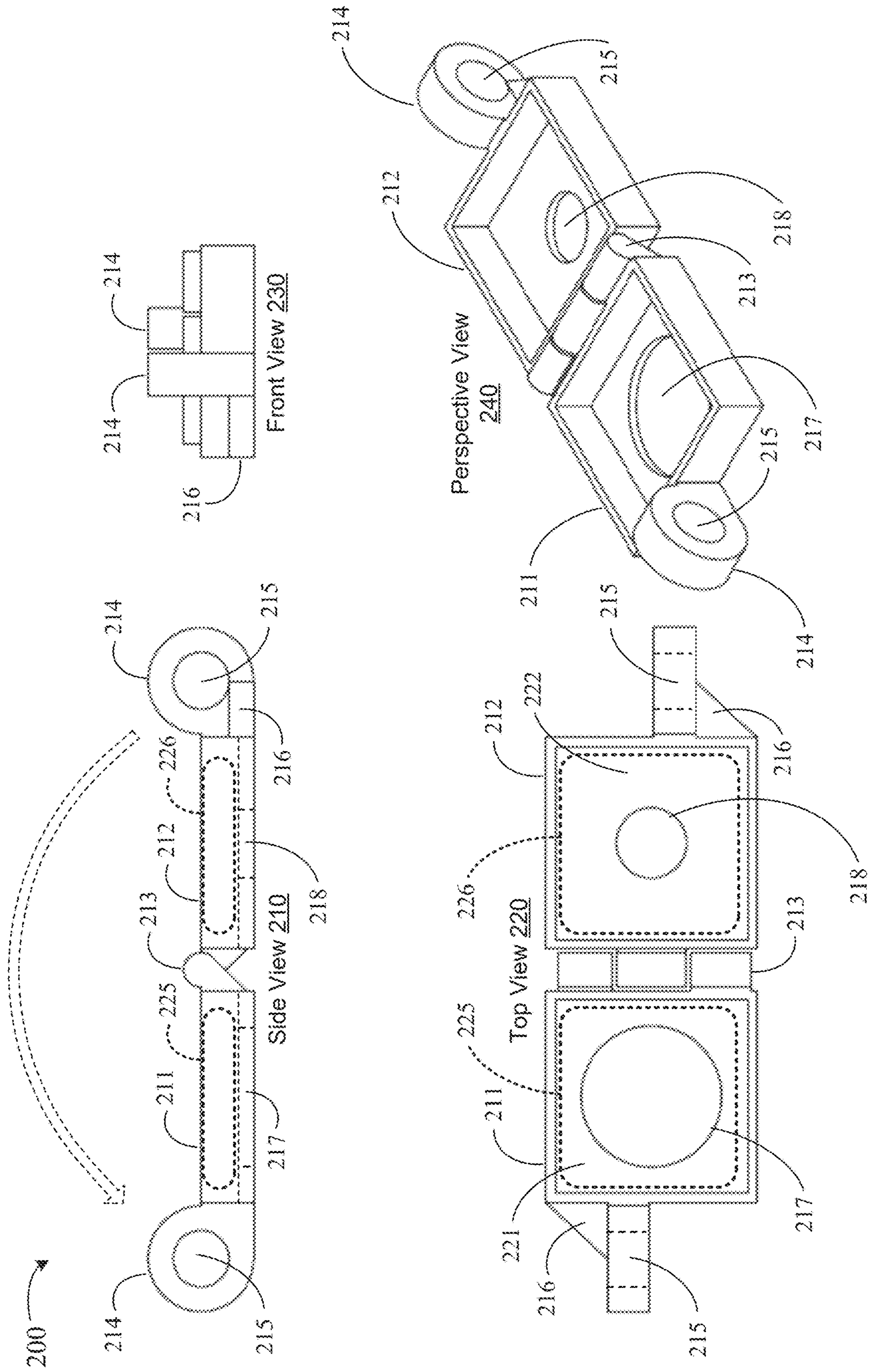
FIGS. 2A-2C provides diagrams illustrating a hinged bracket for a lock out device according to one or more examples.

FIG. 2A provides diagrams illustrating a hinged bracket 200 for a lock out device according to one or more examples, with reference to components and features described herein including but not limited to the figures and associated description. As illustrated in FIG. 2A, the example hinged bracket 200 is shown in a side view 210, a top view 220, a front view 230, and a perspective view 240. The hinged bracket 200 is configured to receive the plug 100 and to be placed over an empty/open fuse holder on a fuse panel. According to examples, the hinged bracket 200 includes a first section 211 and a second section 212. The first section 211 and the second section 212 are moveably connected via a hinge 213 to enable movement of at least one of the first section 211 and/or the second section 212 relative to each other between an open position and a closed position. In some examples the hinge 213 is formed from portions of each of the first section 211 and the second section 212 (as shown in FIG. 2A). In other examples the hinge 213 can be a separate component attached to the first section 211 and to the second section 212.

In the views shown in FIG. 2A, the hinged bracket 200 is illustrated in an open position. As an example, the second section 212 can move toward the first section 211 from an open position to a closed position, in a direction of movement indicated by the dotted line arrow in the side view 210 of FIG. 2A.

Figure 3A:
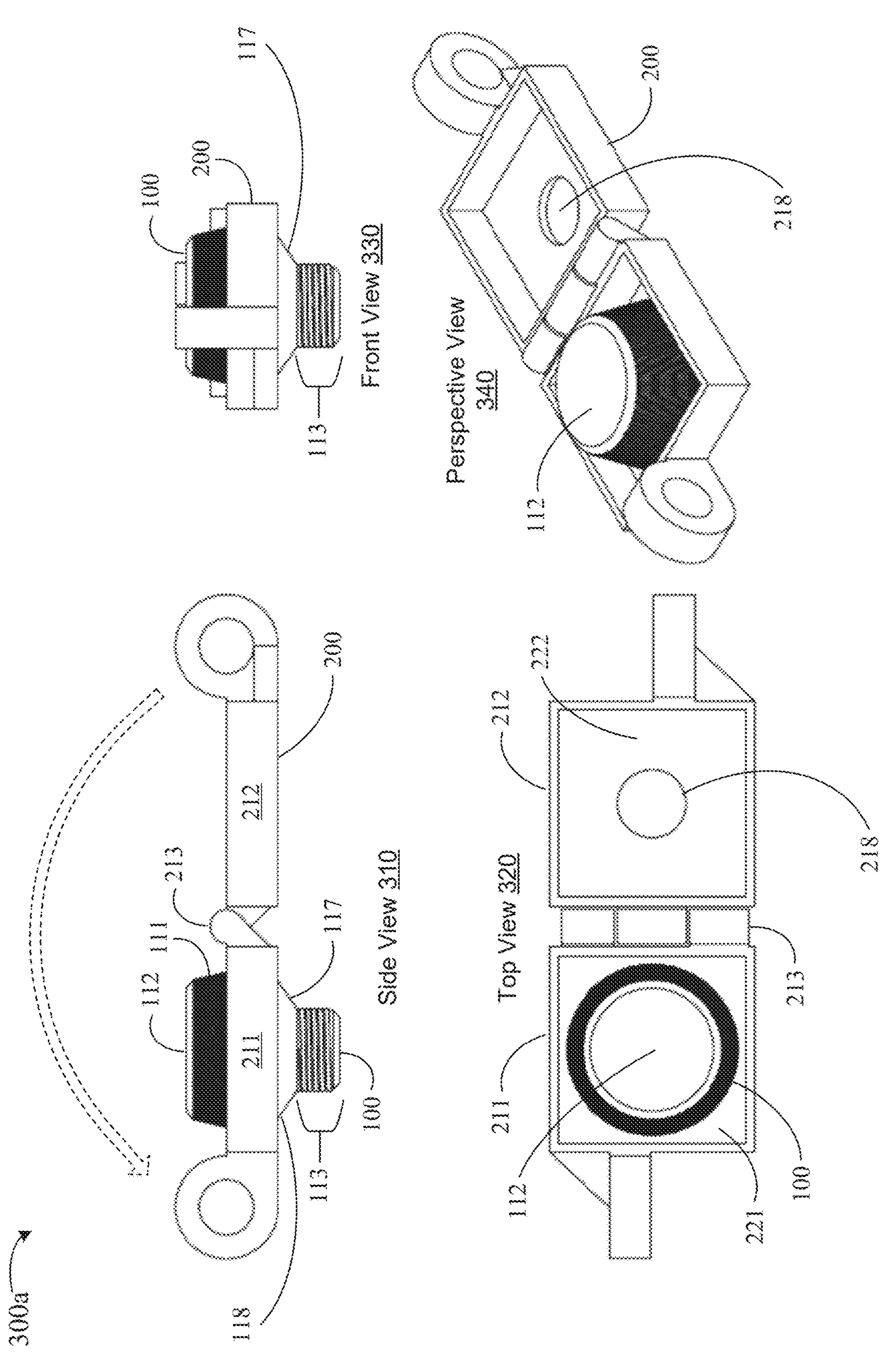
FIGS. 3A-3C provide diagrams illustrating a lock out device according to one or more examples.

According to examples, the first section 211 includes a base portion 221 and one or more walls forming a first cavity 225 (the first cavity 225 is illustrated in FIG. 2A with dotted lines). The first section 211 also includes a first opening 217 in the base portion 221, where the first opening 217 has a first dimension larger than a diameter of the threaded portion 113 of the plug 100 to permit the threaded portion 113 of the plug 100 to pass through the base portion 221. The cap 111 and the first section 211 are sized relative to each other to enable the cap 111 to fit in the first cavity 225 (as shown in FIG. 3A the upper portion of the cap 111 can extend above the walls forming the cavity 225, which enables a person to grip and turn the plug 100 when placed in the hinged bracket 200 in an open position). The first dimension of the first opening 217 is smaller than the lateral dimension 119 of the cap 111. This enables the bottom face 114 of the cap 111 to seat (or rest) against the base portion 221 when the plug 100 is placed into the hinged bracket 200. The first section 211 also includes a first lock portion 214 including a first eye 215 to receive a locking element (not shown in FIG. 2A). The locking element can include a shackle or shank of a lock such as, e.g., a padlock, or a lock utilizing a wire rope, etc.

According to examples, the second section 212 includes a lid portion 222 and one or more walls forming a second cavity 226 (the second cavity 226 is illustrated in FIG. 2A with dotted lines). The cap 111 and the second section 212 are sized relative to each other to enable the cap 111 to fit in the second cavity 226 (as well as in the first cavity 225) when the hinged bracket is in a closed position. The second section 212 also includes a second lock portion 214 including a second eye 215 to receive a locking element (not shown in FIG. 2A). The locking element can include a shackle or shank of a lock such as, e.g., a padlock.

In some examples the second section 212 also includes a second opening 218 in the lid portion 222, the second opening 218 having a second dimension smaller than the lateral dimension 119 of the cap 111. The second opening 218 provides a "window" that, when the plug 100 is inserted in the hinged bracket 200 and the hinged bracket 200 is placed in the closed position, enables personnel to see that the plug 100 is installed but inhibits turning of the plug 100 as long as the hinged bracket 200 is in a closed position.

In some examples the first section 211 includes a first support element 216 adjacent to the first lock portion 214, and the second section 212 includes a second support element 216 adjacent to the second lock portion 214. The first support element 216 is configured to provide additional structural support/strength to the first lock portion 214. Likewise, the second support element 216 is configured to provide additional structural support/strength to the second lock portion 214. As illustrated in FIG. 2A, the first support element 216 forms a triangular tab arranged between the first lock portion 214 and an adjacent wall of the first section 211. Similarly, as illustrated in FIG. 2A, the second support element 216 forms a triangular tab arranged between the second lock portion 214 and an adjacent wall of the second section 212. Further, as illustrated in FIG. 2A each of the support elements 216 are arranged such that they do not interfere with adjacent placement of the lock portions 214 and alignment of the eyes 215 when the hinged bracket 200 is placed in a closed position. It will be understood that the support elements 216 can be formed of size and/or shape different than illustrated in FIG. 2A.

As previously discussed, the first section 211 and the second section 212 are moveably connected via a hinge 213 to enable movement of at least one of the first section 211 and/or the second section 212 relative to each other between an open position and a closed position. In some examples, the hinge 213 includes hinge portions formed in the first section 211 and/or the second section 212 (e.g., a roll pin type hinge), and can include a pin inserted into receiving portions (e.g., a dimple or a channel) of the hinge 213 in one or more of the first section 211 or the second section 212. In some examples, the hinge 213 includes a flexible material (not shown in FIG. 2A) connected to the first section and the second section. In some examples other appropriate hinge types can be used. Although the first section 211 and the second section 212 are illustrated with a square shape as shown in the top view 220 (FIG. 2A, already discussed) other shapes (e.g., from a top view) can be used.

Figure 2B:
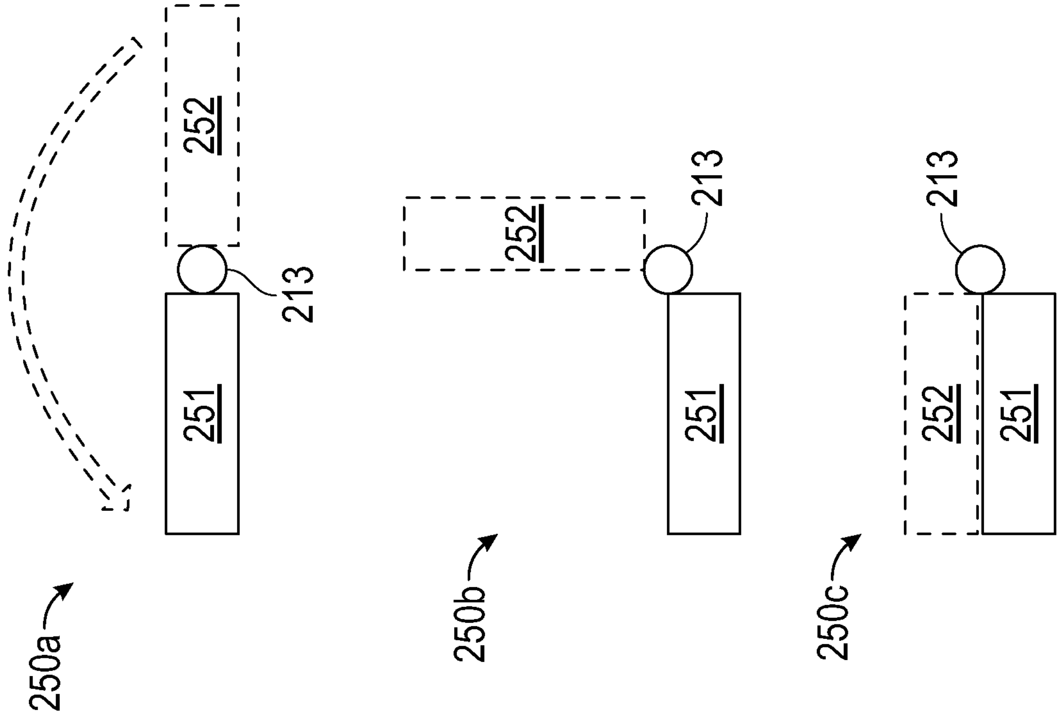
Figure 2C:
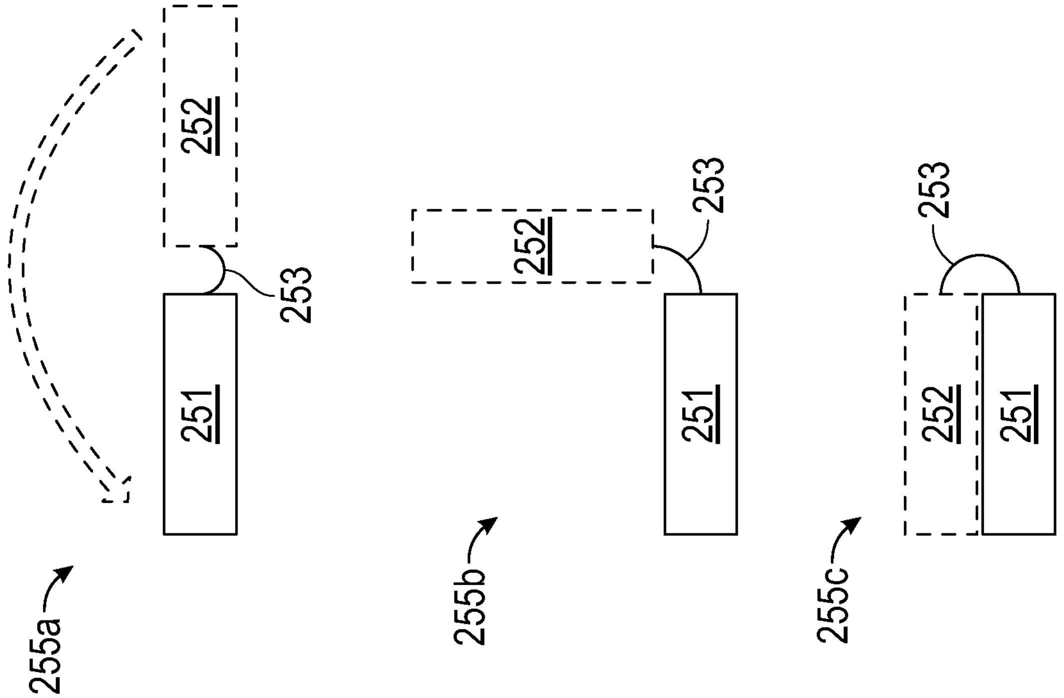

FIGS. 2B-2C illustrate aspects of a hinged bracket according to one or more examples, with reference to components and features described herein including but not limited to the figures and associated description. Turning to FIG. 2B, a hinged bracket 250 (labeled as hinged bracket 250*a*, 250*b* and 250*c*) is shown in a side view in various positions of movement, and includes a first section 251, a second section 252, and a hinge 213. The first section 251 corresponds to the first section 211 (FIG. 2A, already discussed), but for illustrative purposes is shown without all of the detail previously described with reference to FIG. 2A. The second section 252 corresponds to the second section 212 (FIG. 2A, already discussed), but for illustrative purposes is shown without all of the detail previously described with reference to FIG. 2A. The first section 251 and the second section 252 are moveably connected via the hinge 213 to enable movement of at least one of the first section 251 and/or the second section 252 relative to each other between an open position and a closed position. As an example, the second section 252 can move toward the first section 251 from an open position to a closed position, in a direction of movement indicated by the dotted line arrow in FIG. 2B. An example of movement of the second section 252 is illustrated in FIG. 2B, with the second section shown in dotted lines. In the example of FIG. 2B, the hinged bracket 250*a* is illustrated in an open position, the hinged bracket 250*b* is illustrated in a partially open position, and the hinged bracket 250*c* is illustrated in a closed position.

Turning now to FIG. 2C, a hinged bracket 255 (labeled as hinged bracket 255*a*, 255*b* and 255*c*) is shown in a side view in various positions of movement, and includes the first section 251 (FIG. 2B, already discussed), the second section 252 (FIG. 2B, already discussed), and a hinge 253. The example hinge 253 (an alternative to the hinge 213) includes a flexible material that permits movement of the connected sections 251 and 252 relative to each other. Thus, the first section 251 and the second section 252 are moveably connected via the hinge 253 to enable movement of at least one of the first section 251 and/or the second section 252 relative to each other between an open position and a closed position. As an example, the second section 252 can move toward the first section 251 from an open position to a closed position, in a direction of movement indicated by the dotted line arrow in FIG. 2C. An example of movement of the second section 252 is illustrated in FIG. 2C, with the second section shown in dotted lines. In the example of FIG. 2C, the hinged bracket 255*a* is illustrated in an open position, the hinged bracket 255*b* is illustrated in a partially open position, and the hinged bracket 255*c* is illustrated in a closed position.

The hinged bracket 200, the hinged bracket 250, and/or the hinged bracket 255 can be made from a variety of materials such as, for example, plastic, nylon, etc. The hinged bracket 200, the hinged bracket 250, and/or the hinged bracket 255 can be manufactured by any known manufacturing techniques such as, e.g., 3D printing, computer numerical control (CNC) machining, injection molding, etc.

Figure 3B:
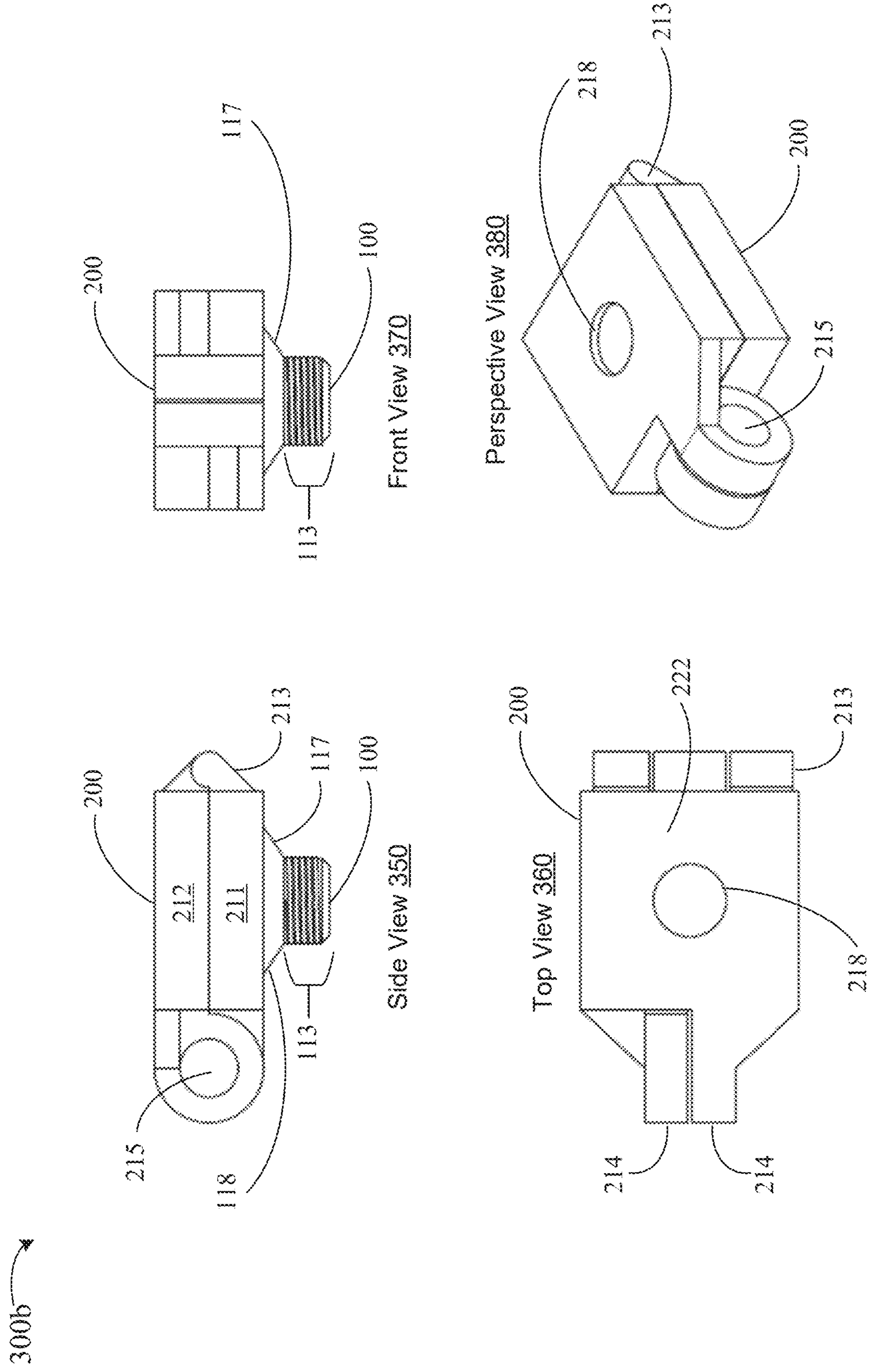
Figure 3C:
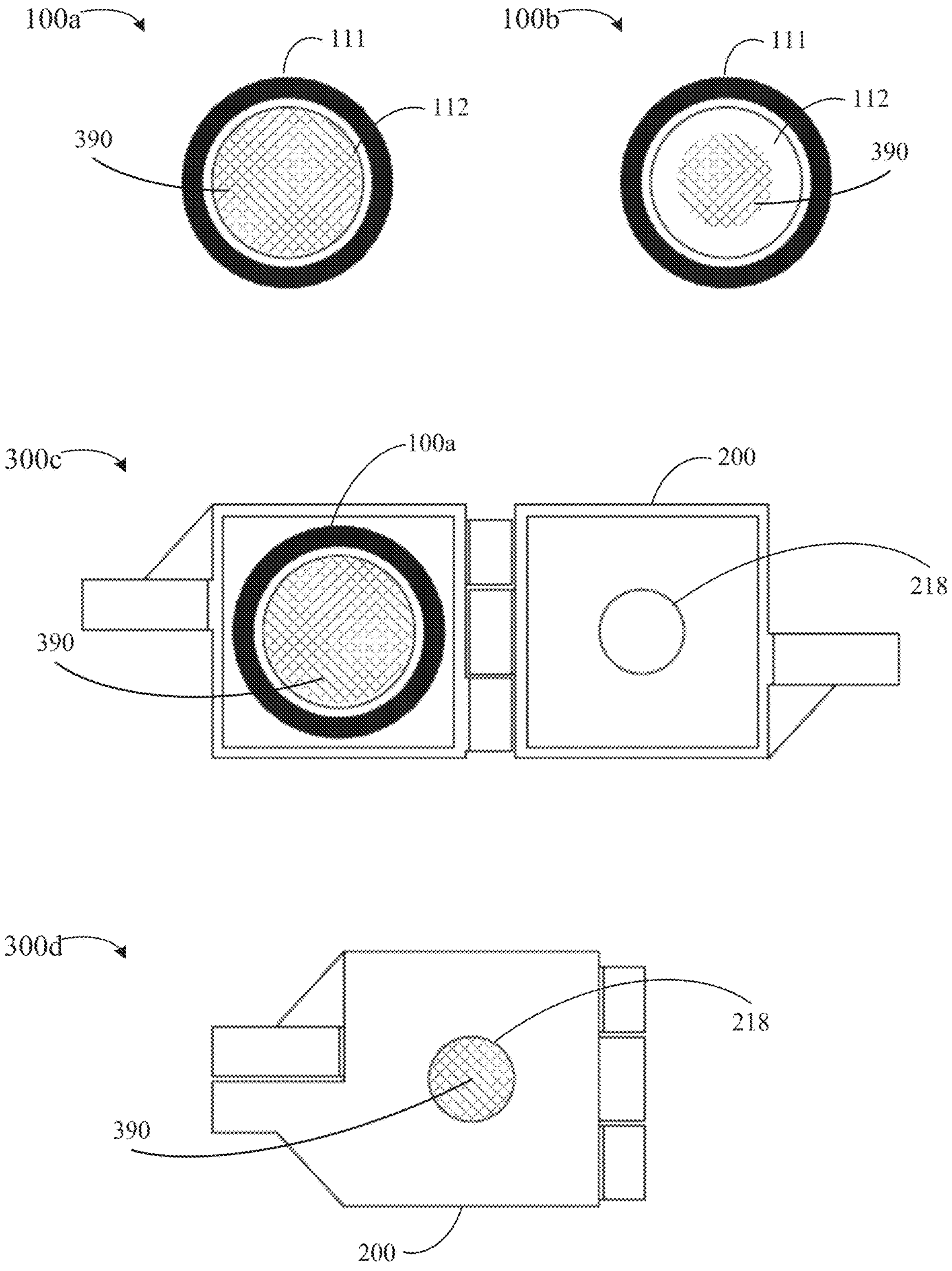

FIGS. 3A-3C provide diagrams illustrating a lock out device 300 (labeled as 300_a_, 300_b_, 300_c_ and 300_d_) according to one or more examples, with reference to components and features described herein including but not limited to the figures and associated description. The lock out device 300 includes the plug 100 (FIG. 1, already discussed) and the hinged bracket 200 (FIG. 2A, already discussed). Turning to FIG. 3A, the lock out device 300 (labeled as 300_a_) is illustrated in several views (a side view 310, a top view 320, a front view 330, and a perspective view 340) with the hinged bracket 200 shown in an open position and with the plug 100 inserted in the hinged bracket 200. As shown in the side view 310, the threaded portion 113 of the plug 100 extends through the first opening 217 of the base portion 221 such that the threaded portion is situated below the first section 211. In examples where the plug 100 includes a beveled edge 117, the beveled edge 117 also extends through the first opening 217 of the base portion 221. In the example shown in FIG. 3A, the beveled edge 117 includes the lip 118 which is pushed or "snapped" through the first opening 217 and engages the bottom face of the base portion 221 to retain the plug 100 in place within the hinged bracket 200 while permitting the plug 100 to be turned. The cap 111 (e.g., at the bottom face 114) is seated on the base portion 221 and is situated in the first cavity 225.

As shown in the example of FIG. 3A, the cap 111 extends beyond the walls of the first section 211 forming the cavity 225, which enables the plug 100 to be gripped and turned so long as the hinged bracket is in an open position. As discussed previously, in an example, the second section 212 can move toward the first section 211 from an open position to a closed position, in a direction of movement indicated by the dotted line arrow in the side view 310 of FIG. 3A.

Turning to FIG. 3B, the lock out device 300 (labeled as 300_b_) is illustrated in several views (a side view 350, a top view 360, a front view 370, and a perspective view 380) with the hinged bracket 200 shown in a closed position and with the plug 100 inserted in the hinged bracket 200. With the hinged bracket 200 in a closed position, the hinged bracket 200 encloses the cap 111 such that personnel cannot grip the cap 111 to turn the plug 100. As shown in the side view 350, the second section 212 is positioned over the first section 211 (e.g., one or more of the second section 212 and the first section 211 have been moved relative to each other via the hinge 213), such that the lid portion 222 of the second section 212 is also positioned over the cap 111. The top portion of the cap 111 is thus in the second cavity 226. As shown in the top view 360 and the perspective view 380, the second opening 218 provides a window through which the top face 112 of the cap 111 is visible when the hinged bracket 200 is in a closed position with the plug inserted in the hinged bracket 200.

As shown in the side view 350 and the perspective view 380, when the hinged bracket 200 is in a closed position the first eye 215 and the second eye 215 are aligned such that a locking element (e.g., a shackle or a shank) can pass through both the first eye 215 and the second eye 215. With a locking element in place through both the first eye 215 and the second eye 215, the first section 211 and the second section 212 cannot be moved apart to place the hinged bracket 200 into an open position such that the hinged bracket 200 is retained in a closed position.

Turning now to FIG. 3C, shown are examples of a plug 100 (labeled as 100_a_ and 100_b_, respectively) illustrated in a top view, where the top face 112 of the cap 111 has a visible indicator 390 to provide a visible contrast between the top face 112 and the hinged bracket 200. The visible indicator 390 can include one or more of a color or a marking. For illustrative purposes only, the visible indicator 390 is shown in FIG. 3C as a pattern of lines, but the visible indicator 390 can include a variety of contrasting color(s) and/or marking (s). For example, a contrasting color can be provided by the material used to manufacture the plug. As another example, a contrasting color can be applied to the top face 112 via, e.g., applying paint, dye, etc. As another example, a marking such as, e.g., line(s), shape(s), letter(s), an insignia, a logo, etc., can be applied to the top face 112 via, e.g., applying paint, ink, etc. For the example plug 100_a_, the visible indicator 390 covers all or essentially all of the top face 112. For the example plug 100_b_, the visible indicator 390 covers less than all or essentially all of the top face 112.

Also shown in FIG. 3C is the lock out device 300 (labeled as 300_c_-300_d_), illustrated in top views with the plug 100_a_ inserted into the hinged bracket 200. The top face 112 of the cap 111 has the visible indicator 390 which can be seen in the illustrated views. As illustrated, the lock out device 300_c_ has the hinged bracket 200 in an open position. The lock out device 300_d_ illustrates the hinged bracket 200 in a closed position, where a portion of the top face 112 with the visible indicator 390 is visible through the second opening 218.

Figure 4B:
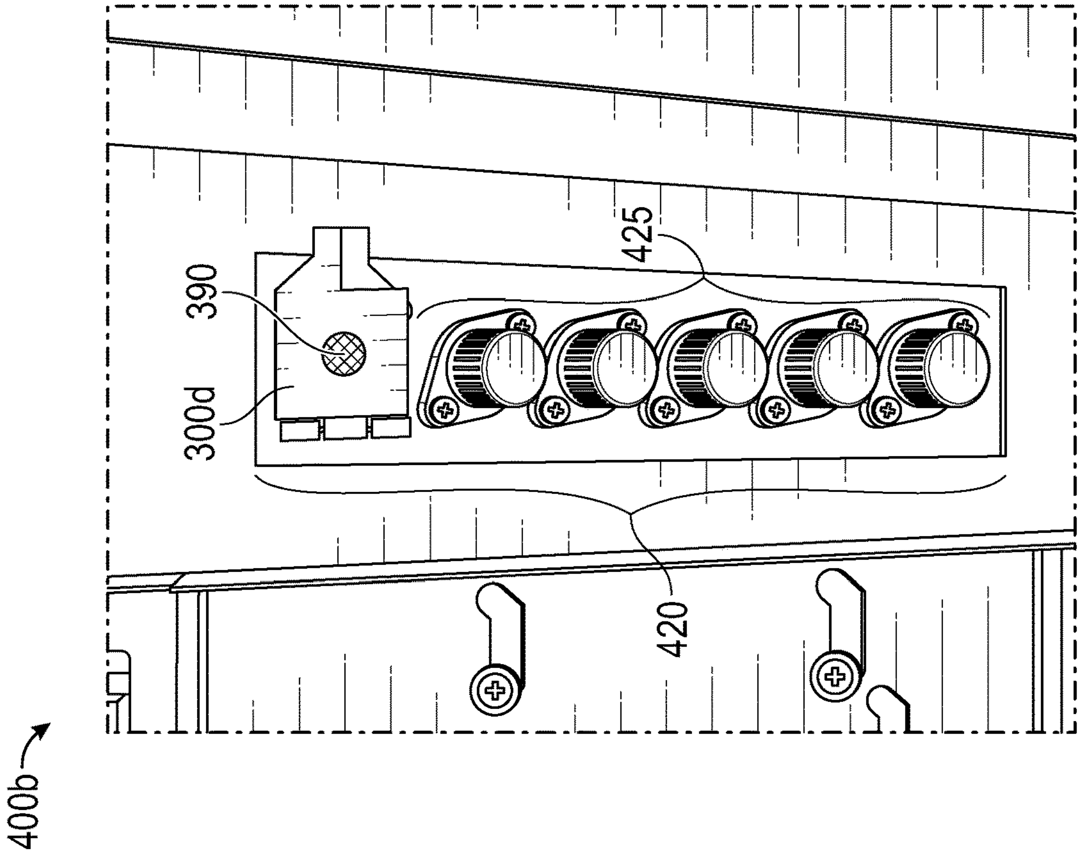
FIGS. 4A-4B provide images illustrating a lock out device installed in a fuse panel according to one or more examples.
Figure 4A:
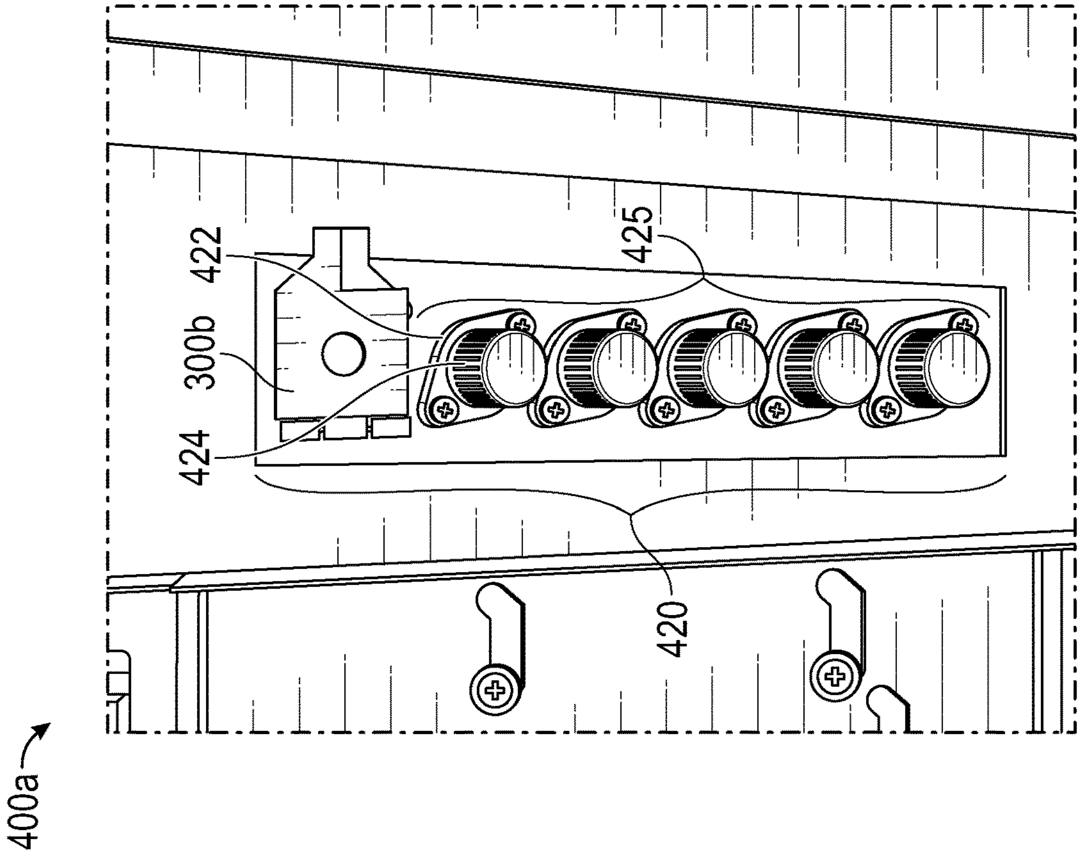

FIGS. 4A-4B provide images 400_a_-400_b_ illustrating a lock out device 300 installed in a fuse panel according to one or more examples, with reference to components and features described herein including but not limited to the figures and associated description. As shown in the image 400_a_, the fuse panel has a row 420 of six fuse holders. A set 425 of the fuse holders each have a threaded cap 424 threadedly inserted in a threaded fuse holder 422. For the fuse holder at the top of the row, the cap and fuse have been removed and the lock out device 300 (labeled as 300_b_) has been installed in the open/empty fuse holder. The lock out device 300 secures the empty fuse holder as previously described.

In examples, the lock out device 300 is installed in the empty fuse holder by inserting a plug (e.g., the plug 100) into a hinged bracket (e.g., the hinged bracket 200) and placing the hinged bracket over the fuse holder such that the first opening of the hinged bracket is positioned over a threaded opening of the fuse holder and/or the threaded portion of the plug is placed at the threaded opening of the fuse holder. Then, the plug is turned to cause the threaded portion of the plug to be threadedly inserted within the fuse holder. Once the plug has been threadedly inserted into the fuse holder, the second section of the hinged bracket is moved over the first section of the hinged bracket and the plug (e.g., as described herein with reference to FIGS. 2A-2C and 3A-3B) to place the hinged bracket in the closed position. Once the hinged bracket is in the closed position with the plug threadedly inserted in the fuse holder, a locking element can be inserted through the first eye (e.g., the first eye 215) of the first lock portion (e.g., the first lock portion 214) and the second eye (e.g., the second eye 215) of the second lock portion (e.g., the second lock portion 214). With the locking element in place, the hinged bracket of the lock out device 300 is retained in the closed position to prevent removal of the lock out device 300 from the fuse holder. As such, the hinged bracket and the locking element, as described herein, provide means for securing the plug when the plug is threadedly inserted into the opening of the fuse holder.

In some examples, the plug is first inserted into the hinged bracket in an open position, and then the unit (i.e., the lock out device 300) is placed over the threaded opening of the fuse holder such that the threaded portion of the plug is at the threaded opening. Then the plug is turned to threadedly insert the threaded portion of the plug into the fuse holder. In some examples, the plug includes a beveled edge with a lip, the plug is inserted into the hinged bracket by snapping the plug into the hinged bracket such that the lip of the beveled edge protrudes through the first opening and engages the base portion to retain the plug in place within the hinged bracket while permitting the plug to be turned. In some examples, the hinged bracket without the plug is first placed over the empty fuse holder and the plug is inserted through the hinged bracket and at the threaded opening of the fuse holder, and then the plug is turned to. to threadedly insert the threaded portion of the plug into the fuse holder.

The image 400*b* (FIG. 4B) shows the same panel arrangement as in the image 400*a* (FIG. 4*a*). In the image 400*b*, the lock out device 300 (labeled as 300*d*) is installed. The lock out device 300 includes a plug with the visible indicator 390 (FIG. 3C, already discussed), visible though the second opening of the hinged bracket, to provide a visual contrast between the plug and the hinged bracket. The lock out device 300 can be installed in the empty fuse holder as described herein with reference to FIG. 4A.

Figure 5C:
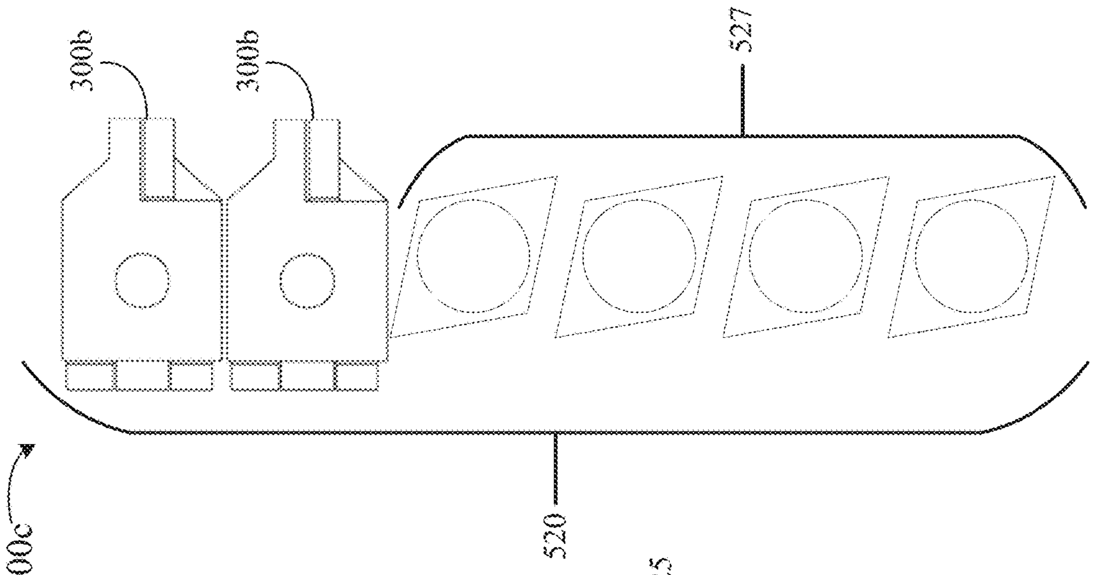
FIGS. 5A-5C provide diagrams illustrating fitting a lock out device in a fuse panel according to one or more examples.
Figure 5B:
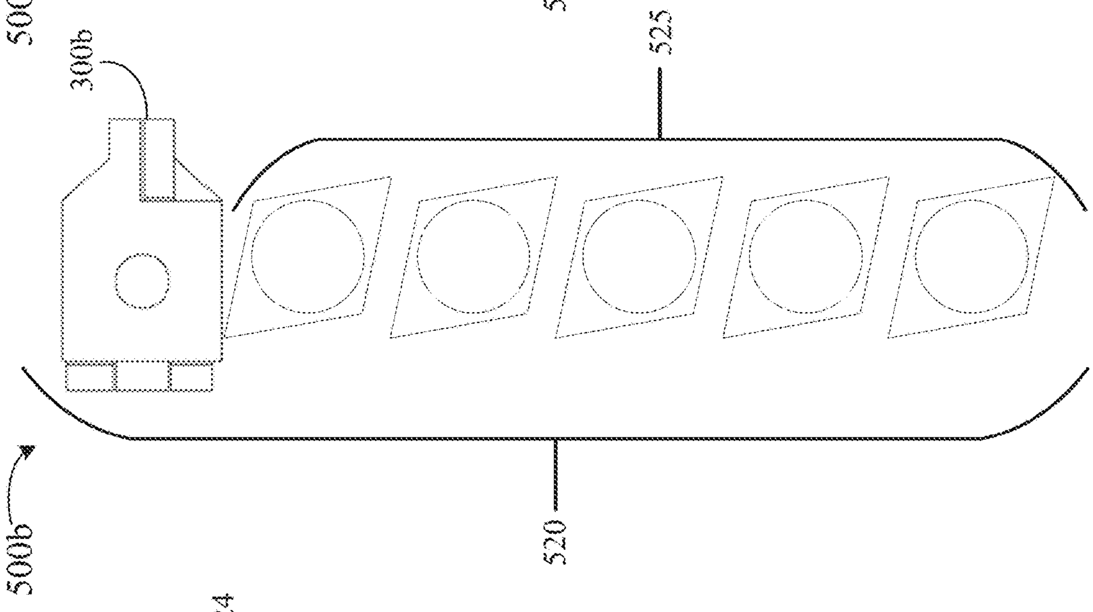
Figure 5A:
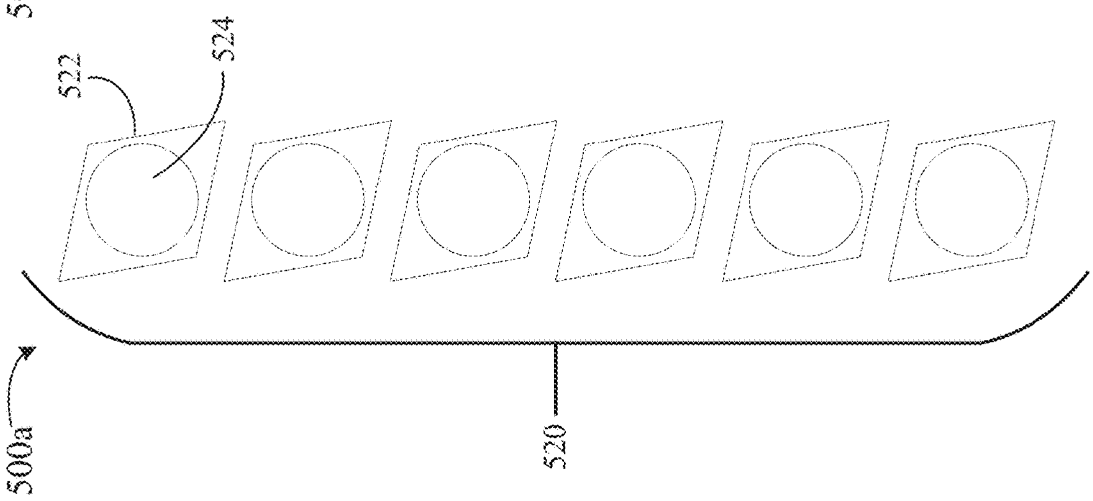

FIGS. 5A-5C provide diagrams illustrating fitting a lock out device in a fuse panel 500 (labeled 500*a*, 500*b* and 500*c*) according to one or more examples, with reference to components and features described herein including but not limited to the figures and associated description. Turning to FIG. 5A, the fuse panel 500 (labeled as 500*a*) has a row 520 of six fuse holders, each illustrating a threaded cap 524 threadedly inserted in a threaded fuse holder 522. The threaded fuse holder 522 can correspond to the threaded fuse holder 422 (FIGS. 4A-4B, already discussed) and the threaded cap 524 can correspond to the threaded cap 424 (FIGS. 4A-4B, already discussed).

Turning now to FIG. 5B, the fuse holder at the top of the row 520 in the fuse panel 500 (labeled as 500*b*) has had the fuse cap and fuse removed, so that the fuse holder has been emptied. The lock out device 300 (labeled as 300*b* and shown with the hinged bracket in the closed position) has been installed in the empty fuse holder (e.g., at the position of the empty fuse holder) as described herein with reference to FIGS. 4A-4B. The lock out device 300 is sized such that, when installed in the empty fuse holder, the other fuse holders remain accessible—e.g., the fuse cap and fuse in any of the other fuse holders 525 can be removed and replaced with a lock out device 300.

Turning now to FIG. 5C, the fuse holder in the second position of the row 520 in the fuse panel 500 (labeled as 500*c*), in addition to the fuse holder at top of the row 520, has had the fuse cap and fuse removed, so that the fuse holder has been emptied. First and second first lock out devices 300 (each labeled as 300*b* and shown with the hinged bracket in the closed position) have each been installed in the empty fuse holders (e.g., at the adjacent positions of the adjacent empty fuse holders) as described herein with reference to FIGS. 4A-4B. Each of the two lock out devices 300 is sized such that they can be installed within adjacent fuse holders in the fuse panel 500, as illustrated in FIG. 5C, and the other fuse holders remain accessible—e.g., the fuse cap and fuse in any of the other fuse holders 527 can be removed and replaced with a lock out device 300. As one example, each lock out device 300 has a dimension (e.g., measured perpendicular to the motion direction defined by the hinge) that is less than the distance between adjacent fuse holders (e.g., measured center-to-center).

Figure 6:
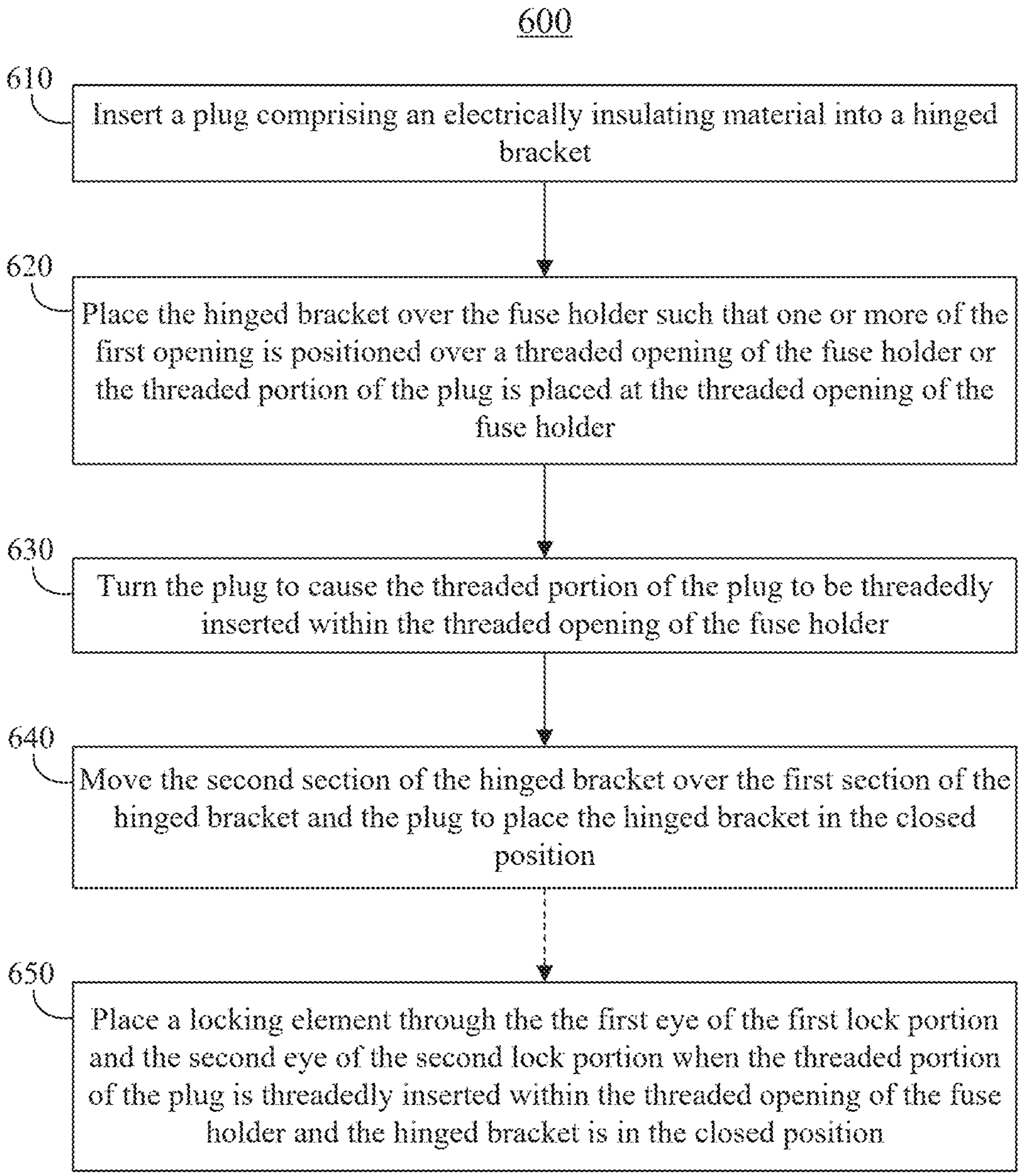
FIG. 6 provides a flow diagram illustrating a method of securing an empty fuse holder according to one or more examples.

FIG. 6 provides a flow diagram illustrating a method of securing an empty fuse holder according to one or more examples, with reference to components and features described herein including but not limited to the figures and associated description.

Illustrated method block 610 provides for inserting a plug, the plug including an electrically insulating material, into a hinged bracket. The plug includes a cap and a threaded portion sized to threadedly engage with a threaded opening of a fuse holder. In examples, the plug corresponds to the plug 100 (FIG. 1, already discussed).

The hinged bracket includes a first section including a base portion and one or more walls forming a first cavity, a first opening in the base portion, the first opening having a first dimension larger than a diameter of the threaded portion of the plug to permit the threaded portion of the plug to pass through the base portion, the first dimension being smaller than a lateral dimension of the cap, and a first lock portion including a first eye to receive a locking element. Additionally, the hinged bracket also includes a second section including a lid portion and one or more walls forming a second cavity, a second opening in the lid portion, the second opening having a second dimension smaller than the lateral dimension of the cap, and a second lock portion including a second eye to receive the locking element.

Additionally, the first section and the second section are moveably connected via a hinge to enable movement of at least one of the first section or the second section relative to each other between an open position and a closed position. When the hinged bracket is in the closed position the first eye of the first lock portion and the second eye of the second lock portion are aligned to enable the locking element to pass through both the first eye and the second eye. The plug is inserted into the hinged bracket such that the threaded portion extends through the first opening. In examples, the hinged bracket corresponds to the hinged bracket (FIGS. 2A-2C, already discussed).

Illustrated method block 620 provides for placing the hinged bracket over the fuse holder such that one or more of the first opening is positioned over a threaded opening of the fuse holder or the threaded portion of the plug is placed at the threaded opening of the fuse holder. Illustrated method block 630 provides for turning the plug to cause the threaded portion of the plug to be threadedly inserted within the fuse holder. Illustrated method block 640 provides for moving the second section of the hinged bracket over the first section of the hinged bracket and the plug to place the hinged bracket in the closed position.

In some examples, illustrated method block 650 provides for placing a locking element through the first eye of the first lock portion and the second eye of the second lock portion when the threaded portion of the plug is threadedly inserted within the fuse holder and the hinged bracket is in the closed position. In some examples, the locking element includes a shackle or shank of a lock such as, e.g., a padlock.

In some examples, the plug further comprises a cylindrical portion having a beveled edge between the cap and the threaded portion, the cylindrical portion has a larger diameter than a diameter of the threaded portion, the beveled edge includes a lip to engage the base portion. Further, in some examples placing the plug into the hinged bracket includes snapping the plug into the hinged bracket such that the lip of the beveled edge protrudes through the first opening and engages the base portion to retain the plug in place within the hinged bracket while permitting the plug to be turned.

ADDITIONAL NOTES AND EXAMPLES

Example A1 includes an apparatus comprising a plug comprising an electrically insulating material, the plug including a cap, and a threaded portion sized to threadedly engage with a threaded opening of a fuse holder, and a hinged bracket to receive the plug, the hinged bracket comprising a first section including a base portion and one or more walls forming a first cavity, a first opening in the base portion, the first opening having a first dimension larger than a diameter of the threaded portion of the plug to permit the threaded portion of the plug to pass through the base portion, the first dimension being smaller than a lateral dimension of the cap, and a first lock portion including a first eye to receive a locking element, and a second section including a lid portion and one or more walls forming a second cavity, and a second lock portion including a second eye to receive the locking element, wherein the first section and the second section are moveably connected via a hinge to enable movement of at least one of the first section or the second section relative to each other between an open position and a closed position, and wherein when the hinged bracket is in the closed position the first eye of the first lock portion and the second eye of the second lock portion are aligned to enable the locking element to pass through both the first eye and the second eye.

Example A2 includes the apparatus of Example A1, wherein the plug is inserted into the hinged bracket such that the threaded portion extends through the first opening.

Example A3 includes the apparatus of Example A1 or A2, wherein the second section includes a second opening in the lid portion, the second opening having a second dimension smaller than the lateral dimension of the cap.

Example A4 includes the apparatus of Example A1, A2 or A3, wherein the hinged bracket is placed in the closed position such that the lid portion is positioned over the cap of the plug and a top face of the cap is visible though the second opening.

Example A5 includes the apparatus of any of Examples A1-A4, wherein the top face of the cap has one or more of a color or a marking to provide a visible contrast between the top face of the cap and the hinged bracket.

Example A6 includes the apparatus of any of Examples A1-A5, wherein the hinge comprises a pin inserted into receiving portions of the hinge in one or more of the first section or the second section.

Example A7 includes the apparatus of any of Examples A1-A6, wherein the hinge comprises a flexible material connected to the first section and the second section.

Example A8 includes the apparatus of any of Examples A1-A7, wherein the plug further comprises a cylindrical portion having a beveled edge between the cap and the threaded portion.

Example A9 includes the apparatus of any of Examples A1-A8, wherein the cylindrical portion has a larger diameter than a diameter of the threaded portion, and wherein the beveled edge includes a lip to engage the base portion and retain the plug in place within the hinged bracket while permitting the plug to be turned.

Example A10 includes the apparatus of any of Examples A1-A9, wherein the first section further includes a first support element adjacent to the first lock portion, and wherein the second section further includes a second support element adjacent to the second lock portion.

Example A11 includes the apparatus of any of Examples A1-A10, wherein the plug and the hinged bracket are each comprised of a material to withstand a threshold amount of force when inserted in a fuse holder, placed in a closed position, and then locked.

Example A12 includes the apparatus of any of Examples A1-A11, wherein the hinged bracket has a size to enable placement in a fuse holder position on a fuse panel.

Example A13 includes the apparatus of any of Examples A1-A12, wherein the size of the hinged bracket is to enable placement of a plurality of hinged brackets in adjacent fuse holder positions on the fuse panel.

Example A14 includes the apparatus of any of Examples A1-A13, wherein a side of the cap includes a surface texture to assist in gripping or turning of the plug.

Example A15 includes the apparatus of any of Examples A1-A14, wherein the side of the cap is tapered.

Example M1 includes a method of securing an empty fuse holder, comprising inserting a plug comprising an electrically insulating material into a hinged bracket, wherein the plug includes a cap, and a threaded portion sized to threadedly engage with a threaded opening of a fuse holder, and wherein the hinged bracket includes a first section including a base portion and one or more walls forming a first cavity, a first opening in the base portion, the first opening having a first dimension larger than a diameter of the threaded portion of the plug to permit the threaded portion of the plug to pass through the base portion, the first dimension being smaller than a lateral dimension of the cap, and a first lock portion including a first eye to receive a locking element, and a second section including a lid portion and one or more walls forming a second cavity, and a second lock portion including a second eye to receive the locking element, wherein the first section and the second section are moveably connected via a hinge to enable movement of at least one of the first section or the second section relative to each other between an open position and a closed position, and wherein when the hinged bracket is in the closed position the first eye of the first lock portion and the second eye of the second lock portion are aligned to enable the locking element to pass through both the first eye and the second eye, wherein the plug is inserted into the hinged bracket such that the threaded portion extends through the first opening, placing the hinged bracket over the fuse holder such that one or more of the first opening is positioned over a threaded opening of the fuse holder or the threaded portion of the plug is placed at the threaded opening of the fuse holder, turning the plug to cause the threaded portion of the plug to be threadedly inserted within the fuse holder, and moving the second section of the hinged bracket over the first section of the hinged bracket and the plug to place the hinged bracket in the closed position.

Example M2 includes the method of Example M1, further comprising placing a locking element through the first eye of the first lock portion and the second eye of the second lock portion when the threaded portion of the plug is threadedly inserted within the fuse holder and the hinged bracket is in the closed position.

Example M3 includes the method of Example M1 or M2, wherein the second section includes a second opening in the lid portion, the second opening having a second dimension smaller than the lateral dimension of the cap, and wherein when the hinged bracket is placed in the closed position the lid portion is positioned over the cap of the plug and a top face of the cap is visible though the second opening.

Example M4 includes the method of Example M1, M2 or M3, wherein the plug further comprises a cylindrical portion having a beveled edge between the cap and the threaded portion, wherein the cylindrical portion has a larger diameter than a diameter of the threaded portion, wherein the beveled edge includes a lip to engage the base portion, and wherein placing the plug into the hinged bracket comprises snapping the plug into the hinged bracket such that the lip of the beveled edge protrudes through the first opening and engages the base portion to retain the plug in place within the hinged bracket while permitting the plug to be turned.

Example D1 includes a lock out device comprising a plug comprising an electrically insulating material, the plug including a cap, and a threaded portion sized to threadedly engage with a threaded opening of a fuse holder, and means for securing the plug when the plug is threadedly inserted into the opening of the fuse holder.

Example sizes/models/values/ranges may have been given, although examples are not limited to the same. As manufacturing techniques (e.g., photolithography) mature over time, it is expected that devices of smaller size could be manufactured. Further, arrangements may be shown in diagram form in order to avoid obscuring examples, and also in view of the fact that specifics with respect to implementation of such block diagram arrangements are highly dependent upon the particular equipment or platform within which the example is to be implemented, i.e., such specifics should be well within purview of one skilled in the art. Where specific details (e.g., circuits) are set forth in order to describe example examples, it should be apparent to one skilled in the art that examples can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. An apparatus comprising:

a plug comprising an electrically insulating material, the plug including:
  - a cap; and
  - a threaded portion sized to threadedly engage with a threaded opening of a fuse holder; and a hinged bracket to receive the plug, the hinged bracket comprising:
  - a first section including:
    - a base portion and one or more walls forming a first cavity;
    - a first opening in the base portion, the first opening having a first dimension larger than a diameter of the threaded portion of the plug to permit the threaded portion of the plug to pass through the base portion, the first dimension being smaller than a lateral dimension of the cap; and
    - a first lock portion including a first eye to receive a locking element; and a second section including:
    - a lid portion and one or more walls forming a second cavity; and
    - a second lock portion including a second eye to receive the locking element;

wherein the first section and the second section are moveably connected via a hinge to enable movement of at least one of the first section or the second section relative to each other between an open position and a closed position; and wherein when the hinged bracket is in the closed position the first eye of the first lock portion and the second eye of the second lock portion are aligned to enable the locking element to pass through both the first eye and the second eye.

2. The apparatus of claim 1, wherein the plug is inserted into the hinged bracket such that the threaded portion extends through the first opening.

3. The apparatus of claim 2, wherein the second section includes a second opening in the lid portion, the second opening having a second dimension smaller than the lateral dimension of the cap.

4. The apparatus of claim 3, wherein the hinged bracket is placed in the closed position such that the lid portion is positioned over the cap of the plug and a top face of the cap is visible though the second opening.

5. The apparatus of claim 1, wherein the top face of the cap has one or more of a color or a marking to provide a visible contrast between the top face of the cap and the hinged bracket.

6. The apparatus of claim 1, wherein the hinge comprises a pin inserted into receiving portions of the hinge in one or more of the first section or the second section.

7. The apparatus of claim 1, wherein the hinge comprises a flexible material connected to the first section and the second section.

8. The apparatus of claim 1, wherein the plug further comprises a cylindrical portion having a beveled edge between the cap and the threaded portion.

9. The apparatus of claim 8, wherein the cylindrical portion has a larger diameter than a diameter of the threaded portion, and wherein the beveled edge includes a lip to engage the base portion and retain the plug in place within the hinged bracket while permitting the plug to be turned.

10. The apparatus of claim 9, wherein the plug and the hinged bracket are each comprised of a material to withstand a threshold amount of force when inserted in a fuse holder, placed in a closed position, and then locked.

11. The apparatus of claim 1, wherein the first section further includes a first support element adjacent to the first lock portion, and wherein the second section further includes a second support element adjacent to the second lock portion.

12. The apparatus of claim 1, wherein the hinged bracket has a size to enable placement in a fuse holder position on a fuse panel.

13. The apparatus of claim 12, wherein the size of the hinged bracket is to enable placement of a plurality of hinged brackets in adjacent fuse holder positions on the fuse panel.

14. The apparatus of claim 1, wherein a side of the cap includes a surface texture to assist in gripping or turning of the plug.

15. The apparatus of claim 14, wherein the side of the cap is tapered.

16. A method of securing an empty fuse holder, comprising:

inserting a plug comprising an electrically insulating material into a hinged bracket, wherein the plug includes:

a cap; and a threaded portion sized to threadedly engage with a threaded opening of a fuse holder; and wherein the hinged bracket includes:

a first section including:

a base portion and one or more walls forming a first cavity;

a first opening in the base portion, the first opening having a first dimension larger than a diameter of the threaded portion of the plug to permit the threaded portion of the plug to pass through the base portion, the first dimension being smaller than a lateral dimension of the cap; and a first lock portion including a first eye to receive a locking element; and a second section including:

a lid portion and one or more walls forming a second cavity; and a second lock portion including a second eye to receive the locking element;

wherein the first section and the second section are moveably connected via a hinge to enable movement of at least one of the first section or the second section relative to each other between an open position and a closed position; and wherein when the hinged bracket is in the closed position the first eye of the first lock portion and the second eye of the second lock portion are aligned to enable the locking element to pass through both the first eye and the second eye;

wherein the plug is inserted into the hinged bracket such that the threaded portion extends through the first opening;

placing the hinged bracket over the fuse holder such that one or more of the first opening is positioned over a threaded opening of the fuse holder or the threaded portion of the plug is placed at the threaded opening of the fuse holder;

turning the plug to cause the threaded portion of the plug to be threadedly inserted within the fuse holder; and moving the second section of the hinged bracket over the first section of the hinged bracket and the plug to place the hinged bracket in the closed position.

17. The method of claim 16, further comprising placing a locking element through the first eye of the first lock portion and the second eye of the second lock portion when the threaded portion of the plug is threadedly inserted within the fuse holder and the hinged bracket is in the closed position.

18. The method of claim 16, wherein the second section includes a second opening in the lid portion, the second opening having a second dimension smaller than the lateral dimension of the cap, and wherein when the hinged bracket is placed in the closed position the lid portion is positioned over the cap of the plug and a top face of the cap is visible though the second opening.

19. The method of claim 16, wherein the plug further comprises a cylindrical portion having a beveled edge between the cap and the threaded portion, wherein the cylindrical portion has a larger diameter than a diameter of the threaded portion, wherein the beveled edge includes a lip to engage the base portion, and wherein placing the plug into the hinged bracket comprises snapping the plug into the hinged bracket such that the lip of the beveled edge protrudes through the first opening and engages the base portion to retain the plug in place within the hinged bracket while permitting the plug to be turned.

* * * * *